United States Patent
Seyfried

(10) Patent No.: US 6,867,919 B2
(45) Date of Patent: Mar. 15, 2005

(54) OPTICAL ARRANGEMENT AND MICROSCOPE

(75) Inventor: Volker Seyfried, Nussloch (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/681,016

(22) Filed: Oct. 8, 2003

(65) Prior Publication Data

US 2004/0070835 A1 Apr. 15, 2004

(30) Foreign Application Priority Data

Oct. 10, 2002 (DE) .......................................... 102 47 247

(51) Int. Cl.[7] .................... G02B 27/10; G02B 21/06; G02B 21/00; G02B 27/40; G01N 21/00

(52) U.S. Cl. .................... 359/618; 359/629; 359/285; 359/385; 359/308; 359/312; 359/368; 250/201.3; 250/225; 356/237.2; 356/400

(58) Field of Search .......................... 250/201.2, 208.1, 250/225, 201.3; 356/237.1, 237.2, 399, 400; 359/618, 629, 305, 308, 307, 312, 285, 287, 306, 368, 381, 385

(56) References Cited

U.S. PATENT DOCUMENTS

| | | | | |
|---|---|---|---|---|
| 4,645,300 A | * | 2/1987 | Brandstetter et al. | 359/285 |
| 4,699,466 A | * | 10/1987 | Brandstetter et al. | 359/308 |
| 5,587,829 A | * | 12/1996 | Alexander et al. | 359/287 |
| 6,091,523 A | * | 7/2000 | Brandstetter | 398/39 |
| 6,421,154 B1 | * | 7/2002 | Diels et al. | 398/182 |
| 6,555,781 B2 | * | 4/2003 | Ngoi et al. | 219/121.67 |
| 6,693,945 B1 | * | 2/2004 | Shimada | 372/98 |
| 6,720,547 B1 | * | 4/2004 | Rajadhyaksha et al. | 250/225 |
| 6,731,383 B2 | * | 5/2004 | Watkins et al. | 356/237.2 |
| 6,747,795 B2 | * | 6/2004 | Lin et al. | 359/385 |

FOREIGN PATENT DOCUMENTS

DE  19906757  12/1999

OTHER PUBLICATIONS

"Femtosecond pulse shaping spatial light modulators", A.M. Weiner, Review of Scientific Instruments, pp. 1929–1960, American Institute of Physics, 2000.

* cited by examiner

Primary Examiner—Loha Ben
(74) Attorney, Agent, or Firm—Davidson, Davidson & Kappel, LLC

(57) ABSTRACT

An optical arrangement for directing illumination light to a sample and for directing the detection light proceeding from the sample to a detector has a spectrally selective influencing means in the beam path of the detection light, which influences the polarization properties of the illumination light reflected or scattered from the sample in such a way that a polarizing beam splitter splits the illumination light reflected or scattered from the sample out of the detection light.

13 Claims, 7 Drawing Sheets

OPTICAL ARRANGEMENT AND MICROSCOPE

CROSS REFERENCE TO RELATED APPLICATIONS

This application claims priority to German patent application 102 47 247.5, the subject matter of which is hereby incorporated by reference herein.

FIELD OF THE INVENTION

The invention concerns an optical arrangement for directing illumination light to a sample and for directing the detection light proceeding from the sample to a detector.

The invention furthermore concerns a microscope with an optical arrangement for directing illumination light to a sample and for directing the detection light proceeding from the sample to a detector.

BACKGROUND OF THE INVENTION

In scanning microscopy, a sample is illuminated with a light beam in order to observe the detection light emitted, as reflected or fluorescent light, from the sample. The focus of an illumination light beam is moved in a specimen plane by means of a controllable beam deflection device, generally by tilting two mirrors, the deflection axes usually being perpendicular to one another so that one mirror deflects in the X direction and the other in the Y direction. Tilting of the mirrors is brought about, for example, by means of galvanometer positioning elements. The power level of the light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture (called the "illumination pinhole"), a beam splitter, a beam deflection device for beam control, a microscope optical system, a detection pinhole, and the detectors for detecting the detected or fluorescent light. The illumination light is coupled in via a beam splitter. The fluorescent or reflected light coming from the specimen travels back through the beam deflection device to the beam splitter, passes through it, and is then focused onto the detection pinhole behind which the detectors are located. Detection light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers, the path of the scanning light beam on or in the specimen ideally describing a meander (scanning one line in the X direction at a constant Y position, then stopping the X scan and slewing by Y displacement to the next line to be scanned, then scanning that line in the negative X direction at constant Y position, etc.). To make possible acquisition of image data in layers, the sample stage or the objective is shifted after a layer is scanned, and the next layer to be scanned is thus brought into the focal plane of the objective.

German Unexamined Application DE 199 06 757 discloses an optical arrangement in the beam path of a light source suitable for fluorescence excitation, preferably in the beam path of a confocal laser scanning microscope, having at least one spectrally selective element for coupling the illumination light of at least one light source into the microscope and for blocking out the illumination light scattered and reflected from the specimen, or the excitation wavelength of the light coming out of from the specimen via the detection beam path. For variable configuration with a very simple design, the optical arrangement is characterized in that illumination light of differing wavelengths can be blocked out by way of the spectrally selective element. Alternatively, an optical arrangement of this kind is characterized in that the spectrally selective element can be set to the excitation wavelength that is to be blocked out. The spectrally selective element can be embodied as an acoustooptical detector (AOD) or an acoustooptical tunable filter (AOTF). In a preferred embodiment, a scanning microscope that utilizes and detects the dispersive properties of the spectrally selective element is disclosed.

The optical arrangement known from the existing art has the disadvantage that only illumination light which has narrow spectral widths, i.e. a few nanometers, can be blocked out of the light coming from the specimen or sample. This is particularly disadvantageous when spectrally broad-band light sources are used.

SUMMARY OF THE INVENTION

It is therefore an object of the present invention to describe an optical arrangement, adjustable individually to the illumination light wavelengths, for directing illumination light to a sample and for directing the detection light proceeding from the sample to a detector, illumination light reflected or scattered from the sample being splittable out of the detection light, said arrangement also being usable with spectrally broad-band illumination light.

The present invention provides an optical arrangement for directing illumination light to a sample and for directing the detection light proceeding from the sample to a detector comprising: a polarizing beam splitter and at least one spectrally selective influencing means arranged in the beam path of the detection light that influences the polarization properties of the illumination light reflected or scattered from the sample in such a way that the polarizing beam splitter splits the illumination light reflected or scattered from the sample out of the detection light.

A further object of the invention is to provide a microscope that can be adjusted individually to the illumination light wavelength, that permits illumination of the sample with broad-band illumination light, and that at the same time largely prevents illumination light reflected or scattered from the sample from impinging upon the detector.

The present invention also provides a microscope with an optical arrangement for directing illumination light to a sample and for directing the detection light proceeding from the sample to a detector comprising: a polarizing beam splitter and at least one spectrally selective influencing means arranged in the beam path of the detection light that influences the polarization properties of the illumination light reflected or scattered from the sample in such a way that the polarizing beam splitter splits the illumination light reflected or scattered from the sample out of the detection light.

The optical arrangement according to the present invention and the microscope according to the present invention permit the use of illumination light of a single laser line and also of several laser lines which preferably derive from the same laser (e.g. argon-ion laser). Spectrally broad light (e.g. white light) is equally usable as illumination light, regardless of whether it derives from laser sources or from conventional light sources such as lamps (e.g. a xenon lamp) or LEDs.

The invention has the advantage of making possible the use of illumination light of almost any desired spectral width. This makes possible, in particular, the use of white-light sources, for example those based on microstructured material or LEDs, etc. In addition, there is no need for complex high-frequency technology. This is advantageous in terms of low maintenance, cost, and greater ease of use.

A further advantage of the invention as compared to the existing art is that the illumination light bundle can possess almost any desired beam cross section.

In a microscope, in particular in a scanning microscope, the illumination light (usually from a laser) is directed to the sample, while the detection light coming from the sample, which can e.g. be fluorescent light and can have a different wavelength, is directed to the detector. The illumination light that is scattered or reflected from the sample does not arrive at the detector, but propagates back toward the light source.

In a preferred embodiment, the spectrally selective influencing means contains a spectral splitting means which can be embodied, for example, as a prism or a grating and which spectrally spreads out the detection light coming from the sample. The spectrally spread-out detection light is preferably focused onto an LCD element. The LCD element is controlled in such a way that the components of the spectrally spread-out detection light that have the wavelength(s) of the illumination light are modified in terms of polarization or phase in such a way that at the polarizing beam splitter, they are split out from the detection light. In a preferred embodiment, this can encompass a rotation of the polarization plane through 90 degrees. In another embodiment, a phase retardation can be effected which, in coaction with retardation plates that preferably are arranged outside the spectrally selective influencing means, results in a rotation of the polarization of the components to be split out. Subsequent to the influencing of the components to be split out, the spectrally spread-out detection light is focused onto a spectral combining means that can be embodied e.g. as a prism or a grating and that coaxially combines the detection light.

In a preferred embodiment, a further polarizing beam splitter is provided that distributes the detection light onto two light paths which the polarizing beam splitter recombines. In another variant, the polarizing beam splitter effects both the distribution onto two light paths and the combination.

In conjunction with liquid crystal displays or other structures having gaps between the actual active surfaces, the use of micro-lens arrays in front of the LCD or the corresponding active element is a useful way to enhance efficiency. It may also be necessary to synchronize the LCD or the corresponding active element with the frame frequency, line frequency, or pixel frequency of a simultaneously operated confocal microscope in order to prevent imaging artifacts. For example, LCDs are typically supplied with an alternating voltage; to improve image quality, it might be advisable to synchronize the frequency of that alternating voltage with the confocal microscope. All types of polarizer, such as polarizer cubes, Wollaston prisms, etc., can of course be used as polarizing elements.

In a preferred embodiment, the LCD display is not necessarily always completely activated, so as to achieve, if applicable, only a partial outcoupling of the illumination light reflected and/or scattered from the sample; thus, if the polarization rotation is not 90° but instead e.g. only 70°, or if the phase shift is not 180° but e.g. only 140°, then only a portion of the reflected and/or scattered illumination light is coupled out, and the remaining portion goes to the detector. This is of interest, for example, for the observation of reflection as well as fluorescence.

In a preferred embodiment, the microscope is a scanning microscope, in particular a confocal scanning microscope, a Nipkow scanner, or a semi-confocal microscope (e.g. a slit scanner).

BRIEF DESCRIPTION OF THE DRAWINGS

The subject matter of the invention is depicted schematically in the drawings and will be described below with reference to the Figures, identically functioning elements being labeled with the same reference characters. In the drawings.

DETAILED DESCRIPTION OF THE INVENTION

Figure 1:
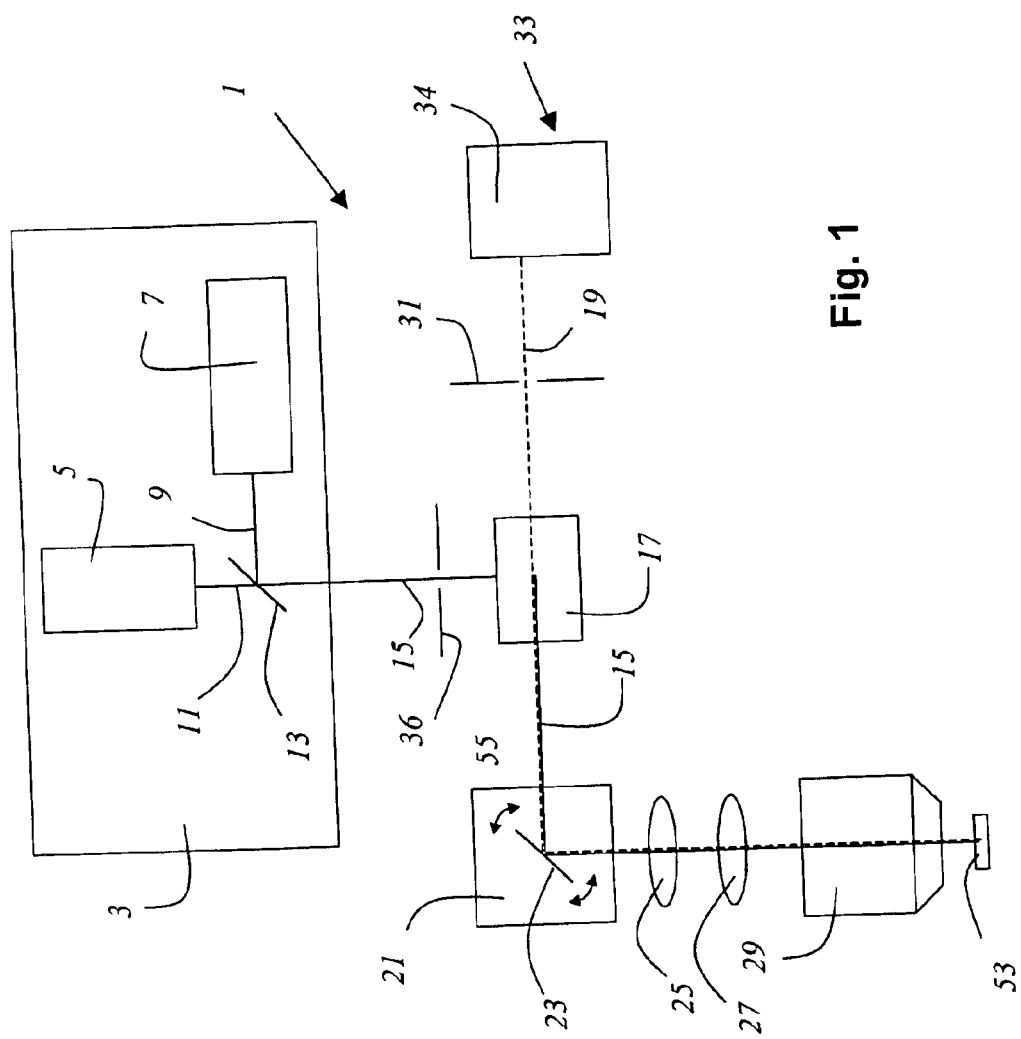
FIG. 1 shows a microscope according to the present invention.

FIG. 1 shows a microscope 1 according to the present invention that is embodied as a confocal scanning microscope, having a light source 3 that contains two lasers 5, 7 whose respective emitted light beams 9, 11 have differing wavelengths, emitted light beams 9, 11 being combined with a dichroic beam combiner 13 to constitute illumination light 15. Microscope 1 has an optical arrangement 17 for directing illumination light 15 to a sample 53 and for directing detection light 19 proceeding from sample 53 to a detector 33, illumination light 15 reflected and/or scattered from sample 53 being split out of detection light 19 by optical arrangement 17 and directed toward light source 3. Illumination light 15 travels from optical arrangement 17 to a beam deflection device 21 which contains a gimbal-mounted scanning mirror 23 and guides illumination light 15 through scanning optical system 25, tube optical system 27, and objective 29 over or through sample 53. Detection light 19 coming from sample 53 passes in the opposite direction through scanning optical system 25, tube optical system 27, and objective 29, and travels via scanning mirror 23 to optical arrangement 17, which splits illumination light 15 reflected and/or scattered from sample 53 out of detection light 19 (e.g. fluorescent light produced in the sample). Optical arrangement 17 is illustrated in detail in the further Figures. After passing through optical arrangement 17 and a detection pinhole 31, detection light 19 strikes a detector 33 which is embodied as a multi-band detector 34. To illustrate the beam paths in the drawing, illumination light 15 is depicted as a solid line and detection light 19 as a dashed line. Illumination pinhole 36 that is usually provided in a confocal scanning microscope is schematically drawn in for the sake of completeness. Omitted in the interest of better clarity, however, are certain optical elements for guiding and shaping the light beams. These are sufficiently familiar to the person skilled in this art.

Several embodiments of optical arrangement 17 according to the present invention will be discussed below with reference to FIGS. 2 through 7, the light path proceeding from the sample being the subject. It is assumed in this context that detection light 19 coming from sample 53 possesses spectral components that are to be reflected, and possesses spectral components that are to be transmitted. It is additionally assumed, with no limitation of generality, that the components to be reflected are polarized, specifically perpendicular to the paper plane.

Figure 2:
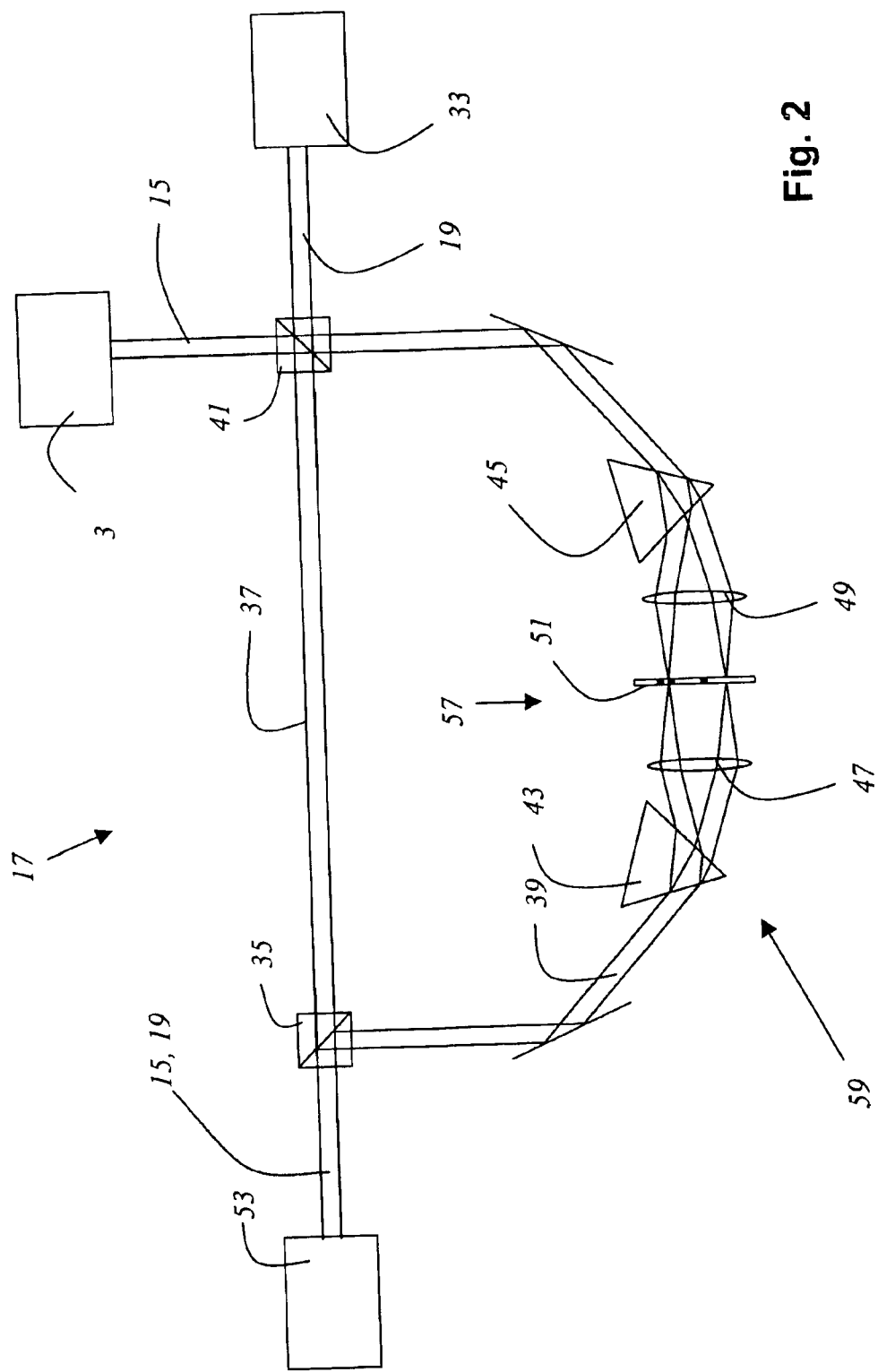
FIG. 2 shows an optical arrangement according to the present invention.
Figure 3:
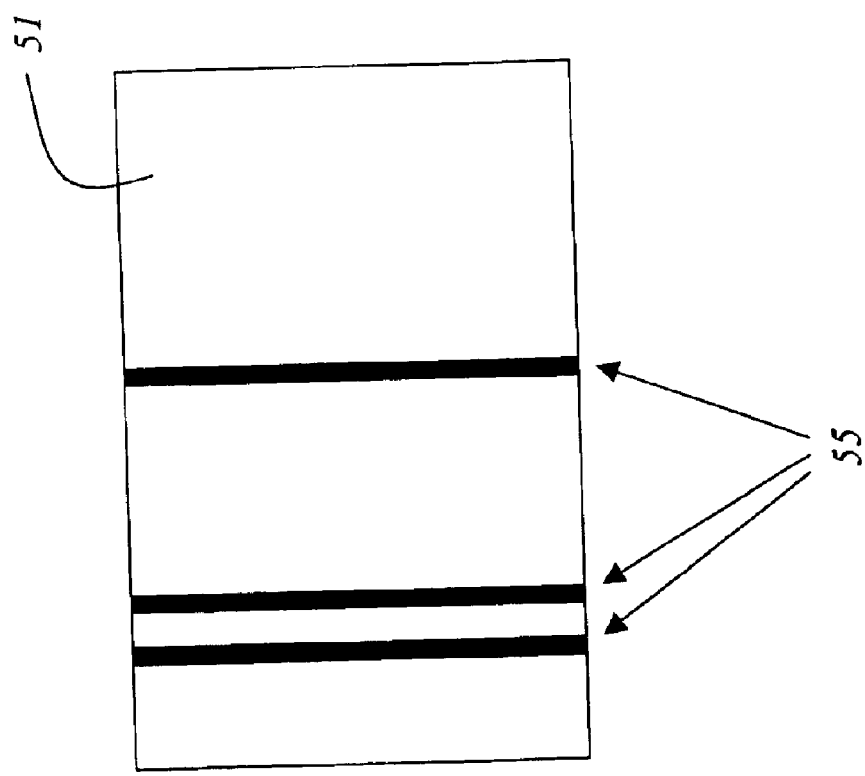
FIG. 3 shows an LCD element of an optical arrangement according to the present invention.

In FIG. 2, detection light 19 coming from sample 53 arrives at a further polarizing beam splitter 35 that transmits detection light 37 polarized in the paper plane and reflects detection light 39 polarized perpendicular thereto. Transmitted detection light 37 polarized in the paper plane is transmitted again at a polarizing beam splitter 41 and travels straight ahead to detector 33. The component of detection light 39 polarized perpendicular to the paper plane is reflected at further polarizing beam splitter 35 and sent through a 4f arrangement made up of a first and second prism 43, 45 and a first and second lens element 47, 49 (or correspondingly imaging mirrors), at the center of which is located a liquid crystal display (LCD) 51 constituting spectrally selective influencing means 57. First prism 43 spectrally and spatially splits out the component of detection light 39 polarized perpendicular to the paper plane. First lens 47, which follows at a distance equal to its focal length f, parallelizes detection light 39 of differing colors from the same location in the beam bundle and at the same time focuses detection light 39 of each identical color onto the plane of liquid crystal display 51, which follows in turn at a distance f. The various spectral components of detection light 39 are then present there in spatially separated fashion. In a specific activation state, e.g. in the switched-off state, liquid crystal display 51 does not modify detection light 39 that passes through, so that detection light 39 is reflected at polarizing beam splitter 41 and is ultimately directed, together with detection light 37 already transmitted at the first beam splitter, toward detector 33. All of detection light 19 is thus ultimately directed to detector 33. If the liquid crystal display is then activated at the location of specific spectral components 55 (e.g. the illumination wavelengths) in such a way that the polarization plane there is rotated through exactly 90° (see FIG. 3), those spectral components are then transmitted at polarizing beam splitter 41 and coupled out of the detection beam path. The beam path of course also functions in the opposite direction: illumination light 15 polarized perpendicular to the paper plane is transmitted at the second beam splitter, rotated in terms of its polarization plane in liquid crystal display 51, and lastly directed onto sample 53. Scattered and reflected light coming from sample 53 is directed back to light source 3, while detection light 19, which possesses a different color, is directed to detector 33.

Figure 4:
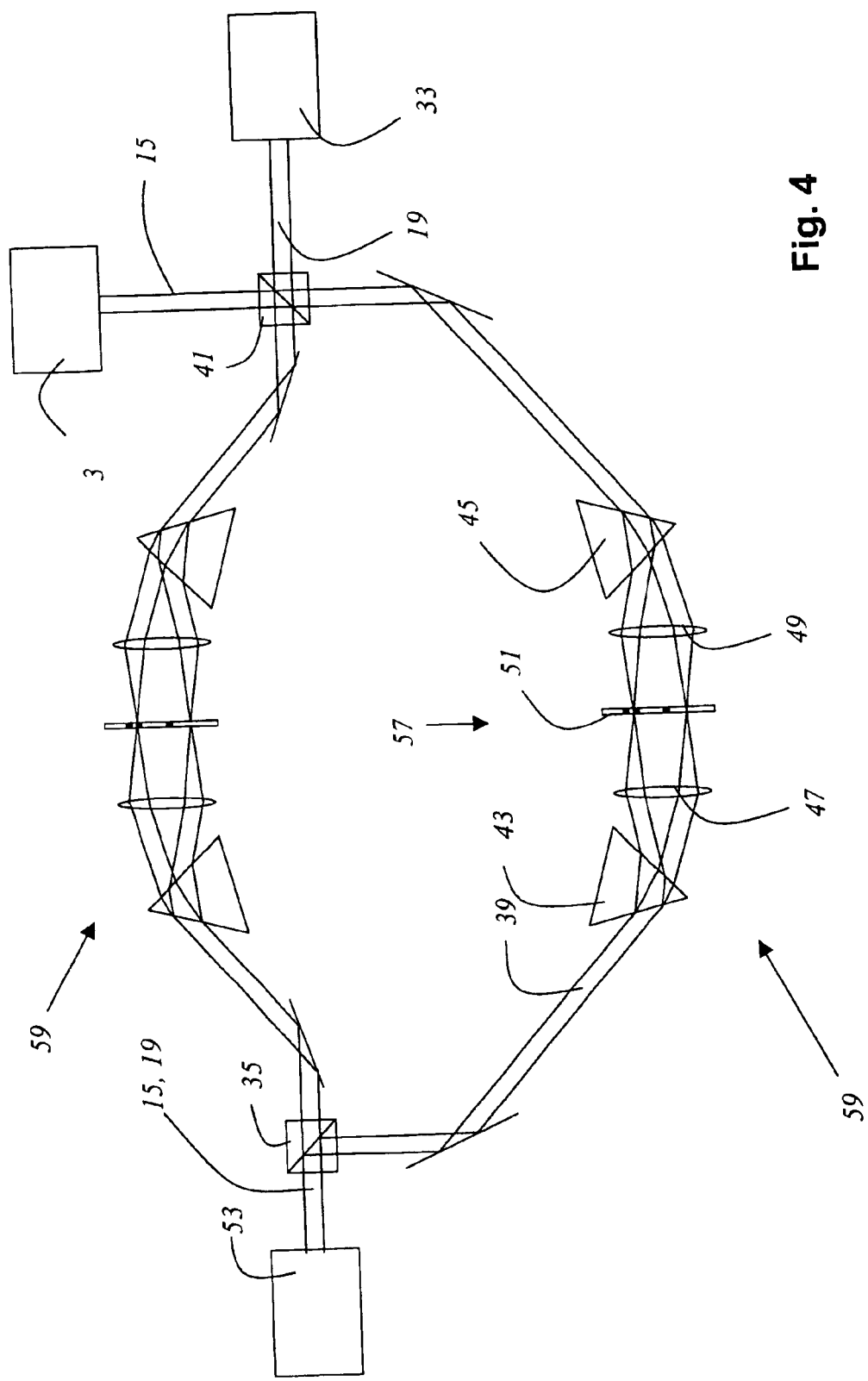
FIG. 4 shows a further optical arrangement according to the present invention.
Figure 5:
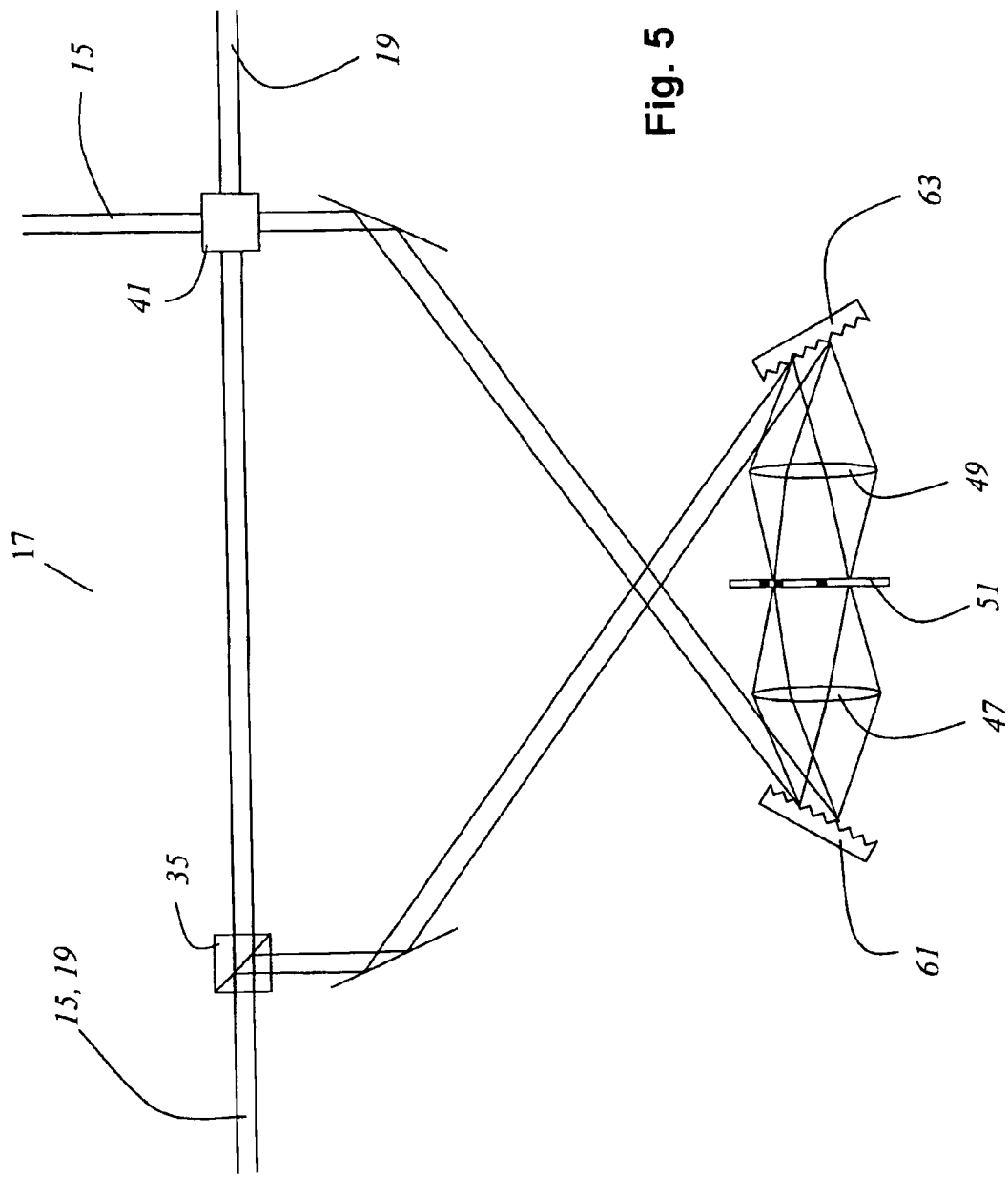
FIG. 5 shows a further optical arrangement according to the present invention.

The procedure in FIG. 2 functions only if illumination light 15 is polarized perpendicular to the paper plane. If it also contains differently polarized components, the complete assemblage of FIG. 4 is needed, in which an influencing arrangement 59 having a spectrally selective influencing means 57 and present in only one branch in FIG. 2, exists in both branches. The assemblage shown in FIG. 4 then largely corresponds, in terms of results, to what is known from arrangements having acoustooptical elements in accordance with the existing art. It is clear that arrangements other than the 4f prism arrangement depicted can also be used for spatial splitting of the detection light. FIG. 5 shows, as an example, an optical arrangement 17 having a first grating 61 and a second grating 63. Further arrangements of this kind for spatial splitting of spectral components also exist in the literature, cf. e.g. Rev. of Scientific Instruments 71 (5) pp. 1929–1960 and the references cited therein.

Figure 6:
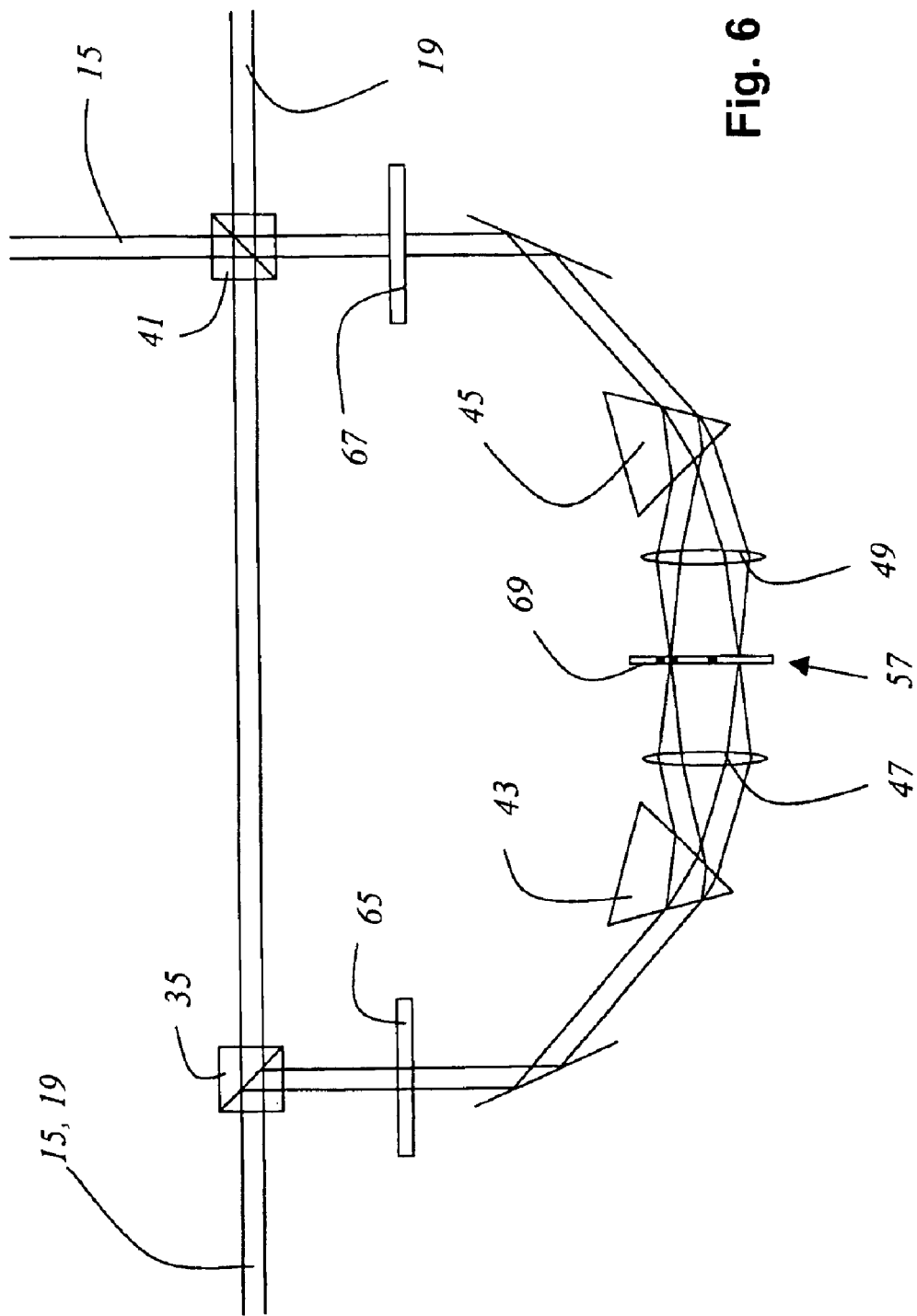
FIG. 6 shows a further optical arrangement according to the present invention.

It is also possible to use as spectrally selective influencing means 57, instead of a polarization-rotating liquid crystal display 51, an LCD 69 that shifts phase through 180°, together with a first and a second suitably oriented $\lambda/2$ plate 65, 67 or similar polarization-rotating optical components, as sketched in FIG. 6. For example, first $\lambda/2$ plate 65 rotates the polarization (originally perpendicular to the paper plane) through 45°, and LCD 69 when activated introduces a phase difference of 180° between the polarizations in and perpendicular to the paper plane, whereas LCD 69 introduces no phase difference when not activated or when differently activated. If second $\lambda/2$ plate is then oriented so that it rotates the polarization through −45° (i.e. backward), the overall result of LCD 69 and $\lambda/2$ plates 65, 67 is to rotate the polarization through 90° when activated and 0° when not activated, so that the same argument applies as for FIG. 2.

Note that spectrally selective influencing means 57 need not necessarily be an LCD. The same object can also be achieved just as easily using electrooptical, acoustooptical, electromechanical or other components.

Figure 7:
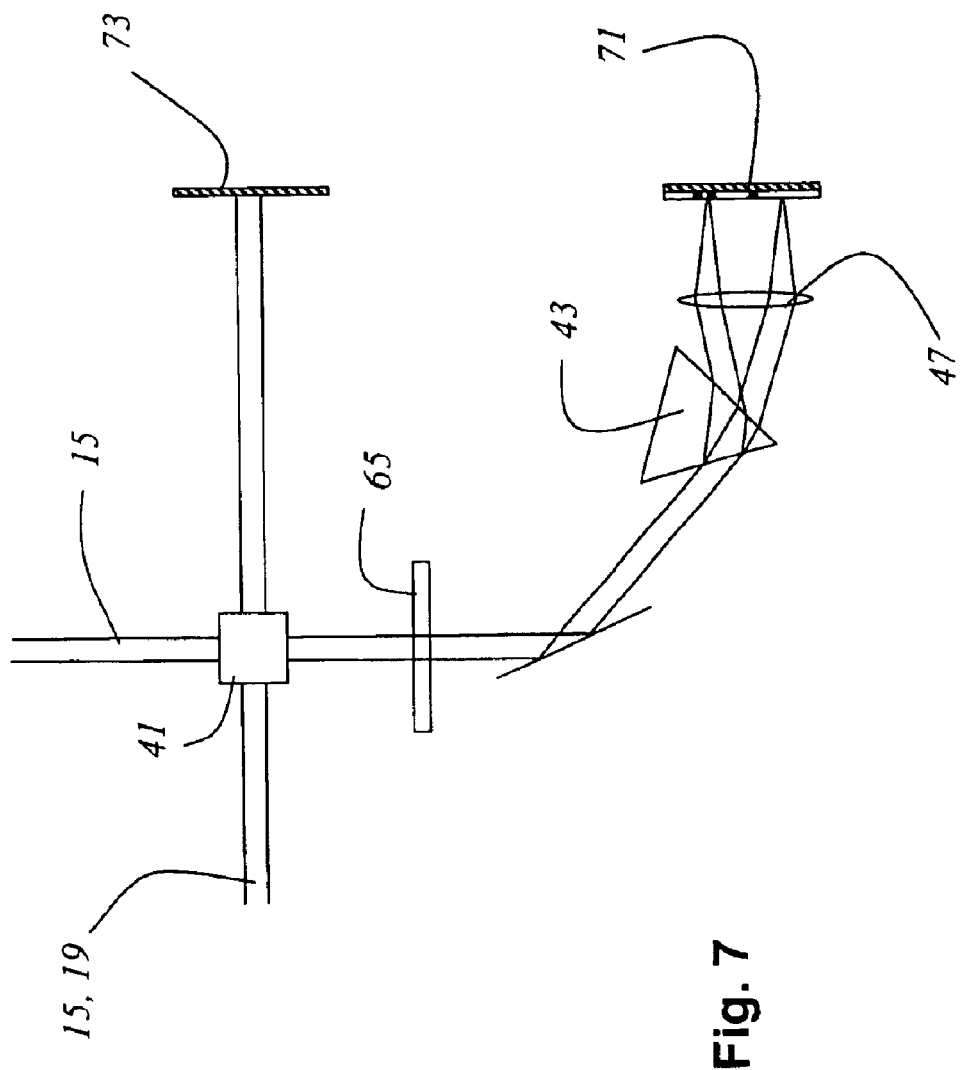
FIG. 7 shows a further optical arrangement according to the present invention having a single polarizing beam splitter.

In the optical arrangements illustrated in the previous Figures, some elements—for example prisms, gratings, polarizing beam splitters, lens elements, or the LCD element—are present in pairs. By suitable direction of the detection light and illumination light, this can be eliminated by using each single element more than once. In the case of the complete assemblage shown in FIG. 4, in particular, the LCD can be used more than once, different spatial regions preferably being utilized. FIG. 7 for example, shows a folded arrangement in which phase is once again shifted as in FIG. 6. A phase-shifting liquid crystal display 71 mirror-coated on the back side is used here to establish, in position-sensitive fashion, different phases for the two polarization components of the components of detection light 19 rotated through 45° by $\lambda/2$ plate 65 and reflected at polarizing splitter 41. An LCD together with a discrete mirror can of course also be used instead of the mirror-coated LCD. It is important that LCD 71 mirror-coated on the back side, or the associated discrete mirror, as well as mirror 73, be arranged in the beam path with a slight spatial tilt (e.g. out of the paper plane), so that the detection light does not go back in the direction of the laser but instead is spatially separated.

The folded configuration has the additional advantage that fewer components are needed, and that alignment becomes easier. The other exemplary embodiments shown can, of course, also be constructed in folded fashion; double passage through an LCD of course means that the polarization rotation or phase shift must be adapted appropriately (e.g. 45° polarization rotation or 90° phase shift). In general, all the assemblages as sketched in FIG. 4 can be constructed completely in both branches, but usually the simpler configuration is sufficient, e.g. when a polarized laser is used.

The invention has been described with reference to a particular exemplary embodiment. It is self-evident, however, that changes and modifications can be made without thereby leaving the range of protection of the claims below.

What is claimed is:

1. An optical arrangement for directing illumination light to a sample and for directing the detection light proceeding from the sample to a detector comprising: a polarizing beam splitter and at least one spectrally selective influencing means arranged in the beam path of the detection light that influences the polarization properties of the illumination light reflected or scattered from the sample in such a way that the polarizing beam splitter splits the illumination light reflected or scattered from the sample out of the detection light.

2. The optical arrangement as defined in claim 1, wherein the spectrally selective influencing means contains at least one prism or one grating.

3. The optical arrangement as defined in claim 1, wherein the spectrally selective influencing means contains an LCD element.

4. The optical arrangement as defined in claim 1, wherein the spectrally selective influencing means contains a phase-shifting liquid crystal display mirror-coated on the back side.

5. The optical arrangement as defined in claim 1, further comprising a further polarizing beam splitter that distributes the detection light onto two light paths which the polarizing beam splitter recombines.

6. A microscope with an optical arrangement for directing illumination light to a sample and for directing the detection light proceeding from the sample to a detector comprising: a polarizing beam splitter and at least one spectrally selective influencing means arranged in the beam path of the detection light that influences the polarization properties of the illumination light reflected or scattered from the sample in such a way that the polarizing beam splitter splits the illumination light reflected or scattered from the sample out of the detection light.

7. The microscope as defined in claim 6, wherein the spectrally selective influencing means contains at least one prism or one grating.

8. The microscope as defined in claim 6, wherein the spectrally selective influencing means contains an LCD element.

9. The microscope as defined in claim 6, wherein the spectrally selective influencing means contains a phase-shifting liquid crystal display mirror-coated on the back side.

10. The microscope as defined in claim 6, wherein a further polarizing beam splitter is provided that distributes the detection light onto two light paths which the polarizing beam splitter recombines.

11. The microscope as defined in claim 6, wherein the microscope is a scanning microscope, in particular a confocal scanning microscope.

12. The microscope as defined in claim 6, wherein the microscope is a Nipkow scanner.

13. The microscope as defined in claim 6, wherein the microscope is a line scanner.

* * * * *